(12) United States Patent
Freund et al.

(10) Patent No.: US 9,440,784 B2
(45) Date of Patent: Sep. 13, 2016

(54) AUTOMOBILE SAFETY KIT AND METHODS OF USING THE SAME

(71) Applicants: Julie Freund, Crystal Lake, IL (US); Kristen Anderson, Crystal Lake, IL (US); Sidney Dickinson, Crystal Lake, IL (US); Audrey Godsell, Crystal Lake, IL (US); Theresa Grivas, Crystal Lake, IL (US); Caroline Rausch, Lake in the Hills, IL (US)

(72) Inventors: Julie Freund, Crystal Lake, IL (US); Kristen Anderson, Crystal Lake, IL (US); Sidney Dickinson, Crystal Lake, IL (US); Audrey Godsell, Crystal Lake, IL (US); Theresa Grivas, Crystal Lake, IL (US); Caroline Rausch, Lake in the Hills, IL (US)

( * ) Notice: Subject to any disclaimer, the term of this patent is extended or adjusted under 35 U.S.C. 154(b) by 254 days.

(21) Appl. No.: 14/285,731

(22) Filed: May 23, 2014

(65) Prior Publication Data

US 2015/0336735 A1 Nov. 26, 2015

(51) Int. Cl.
*B65D 69/00* (2006.01)
*B65D 85/00* (2006.01)
*B65D 25/54* (2006.01)
*B65D 43/16* (2006.01)
*B60R 22/32* (2006.01)
*A62B 99/00* (2009.01)
*A62B 3/00* (2006.01)

(52) U.S. Cl.
CPC .............. *B65D 85/70* (2013.01); *A62B 3/005* (2013.01); *A62B 99/00* (2013.01); *B60R 22/32* (2013.01); *B65D 25/54* (2013.01); *B65D 43/16* (2013.01); *B65D 85/00* (2013.01); *B60R 2022/328* (2013.01)

(58) Field of Classification Search
CPC ......... B25F 1/00; B65D 85/70; B65D 25/54; B65D 43/16; B60R 2022/328; B60R 21/00

USPC ...... 206/38, 223, 570, 573, 335, 803; 7/100, 7/143, 144, 158; 441/80, 88, 89, 93, 133
See application file for complete search history.

(56) References Cited

U.S. PATENT DOCUMENTS

| | | | | |
|---|---|---|---|---|
| 3,951,260 A * | 4/1976 | Frazee | ................... | A61F 17/00 206/573 |
| 4,363,147 A * | 12/1982 | Deweese | ................... | B25F 1/00 7/158 |
| 4,456,126 A * | 6/1984 | Hicks, Jr. | ................ | B60Q 7/00 206/573 |
| 5,251,351 A * | 10/1993 | Klotz | ........................ | A47L 1/08 7/100 |
| 5,515,974 A * | 5/1996 | Higson | .................... | A62B 3/00 206/223 |
| 6,551,159 B1 * | 4/2003 | Spinelli | ................... | B60R 21/00 441/80 |
| 7,051,391 B2 * | 5/2006 | Wang | ........................ | B25F 1/00 7/144 |
| 2013/0299383 A1 * | 11/2013 | Hernandez | ............. | A61F 17/00 206/570 |
| 2014/0119040 A1 * | 5/2014 | Petrucelli | ................ | B60Q 7/00 362/523 |

* cited by examiner

*Primary Examiner* — Luan K Bui
(74) *Attorney, Agent, or Firm* — Scherrer Patent & Trademark Law, P.C.; Stephen T. Scherrer; Monique A. Morneault

(57) ABSTRACT

The present invention relates to an automobile safety kit and methods of using the same. Specifically, the present invention comprises safety articles contained within a rigid, resilient and easily-openable container having items therein useful for protecting automobile passengers during a flood or other natural disaster event. The kit preferably comprises a length of resilient rope having a carabineer or other connector on an end thereof, a seatbelt cutter, a window hammer for breaking an automobile window, and a pair of magnetic clamps having handles thereon for utilization by a user to remain on or in proximity to the automobile or other metal structure, especially during a flood.

20 Claims, 3 Drawing Sheets

AUTOMOBILE SAFETY KIT AND METHODS OF USING THE SAME

TECHNICAL FIELD

The present invention relates to an automobile safety kit and methods of using the same. Specifically, the present invention comprises safety articles contained within a rigid, resilient and easily-openable container having items therein useful for protecting automobile passengers during a flood or other natural disaster event. The kit preferably comprises a length of resilient rope having a carabineer or other connector on an end thereof, a seatbelt cutter, a window hammer for breaking an automobile window, and a pair of magnetic clamps having handles thereon for utilization by a user to remain on or in proximity to the automobile or other metal structure, especially during a flood.

BACKGROUND

Automobiles and other vehicles, such as trucks, recreational vehicles, motorcycles, and other like vehicles, are completely prevalent in modern society and culture. Indeed, in the United States and in many places around the world, a vast number of individuals own at least one vehicle. In many cases, individuals own two or more.

Since the dawn of this "automobile age", automobile safety has dominated discussions. Clearly, automobile safety ought to be a primary concern, for several reasons. First, automobiles tend to travel at increased velocities, and often weigh several thousand pounds. Thus, the potential for serious injury or even death is very real, especially during dangerous driving conditions.

In many cases, individuals may control various aspects of safe driving, such as maintaining proper control of an automobile, following proper safety procedures, following rules of the road, obeying traffic signals, and otherwise ensuring that the act of driving the automobile does not become dangerous. In many other cases, however, an individual may be driving an automobile following all proper safety precautions, rules, traffic signals, but the act of driving the automobile may still be hazardous. For example, during natural disaster events, such as extreme weather (hurricanes, tornadoes, ice, snow and the like), earthquakes, flooding, such as flash flooding or tsunamis, or other like natural disasters, it may be very difficult to be safe. In many cases, staying inside an automobile during a natural disaster event can lead to increased risk of injury or even death.

Therefore, it may be imperative for a passenger of a vehicle to leave the vehicle as quickly as possible. For example, during a tornado or hurricane, an automobile may be very unsafe, as the devastating winds of a tornado or hurricane may physically pick up the automobile from the roadside, sending it crashing down in another location. Thus, common safety practice is to exit an automobile during such an event.

Remaining within an automobile during a flood event may be devastating, as passengers are typically not within sealed compartments. Thus, water from a flood may easily enter the internal space of an automobile, trapping the individuals therein and removing breathable air. In many cases, a flood event can be caused simply by a person accidentally running off the road into a body of water. Water would quickly enter the internal compartment, and an individual would not have much time in which to exit the vehicle.

Often, however, an automobile trapped in a flood or within a body of water causes an increase in pressure around the internal compartment, even as the internal compartment fills with water. In many situations, it is often difficult for a passenger to open a window or a door of a closed automobile due to external water pressure pressing against the internal passenger compartment. A need exists, therefore, for an automobile safety kit that aids an individual in escaping an automobile. Specifically, a need exists for an automobile safety kit that allows a passenger to open doors and/or windows during a natural disaster, such as a flood or the like.

Moreover, an individual may have very little time to make decisions on how best to proceed. While seatbelts are an important safety feature in modern automobiles, oftentimes, they can trap an individual within the automobile. A seatbelt may be difficult to reach, may become damaged or entangled, and/or may simply be too difficult to operate during an emergency. A need exists for an automobile safety kit comprising a seatbelt cutter that allows a user to cut the seatbelt to aid the user in escaping an automobile during an emergency.

Once a passenger is released from a seatbelt during an emergency, such as a flood, it is often safer for a user to be tethered to an anchor so that the user is not swept away by the flood currents. For example, during a flash flood or a tsunami, water may move very swiftly. And while the water may not have the power to force the movement of an automobile, it may quickly sweep a passenger away if the passenger is not sufficiently tethered. Thus, a need exists for an automobile safety kit that allows an individual to tether himself or herself, or another passenger, to an anchor, such as to the automobile itself. Specifically, a need exists for an automobile safety kit that allows an individual to remain anchored to the automobile so that he or she is not swept away by fast moving currents.

In some cases, a passenger's best location to remain is atop the automobile; especially during a flood event where the waters are swiftly moving, but do not entirely cover the car. If a person can remain with the automobile, especially atop the automobile, there is a better chance the person can be seen by rescuers, and less of a possibility the person may be swept away by fast moving water currents. Moreover, there may be debris in the swift-moving water, and a person may be injured if he or she falls into the water or tries to swim through the water. However, automobiles often do not have sufficient handles or hand-holds on top of a car, and it is often difficult for a person to hold onto to the top of a car, especially during an emergency. A need, therefore, exists for an automobile safety kit that allows a user to easily remain atop an automobile during a flood event. More specifically, a need exists for an automobile safety kit that provides a user with magnetic clamps with handles so that a user may magnetically clamp him or herself to the top of the vehicle, such that the user may have sufficient grip.

In addition, oftentimes, especially during natural disasters, it may be difficult for rescuers to see submerged vehicles, especially if the event happens at night. A need, therefore, exists for an automobile safety kit having a visual or audible indicator to aid others in rescuing passengers.

SUMMARY OF THE INVENTION

The present invention relates to an automobile safety kit and methods of using the same. Specifically, the present invention comprises safety articles contained within a rigid, resilient and easily-openable container having items therein useful for protecting automobile passengers during a flood or other natural disaster event. The kit preferably comprises a length of resilient rope having a carabineer or other connector on an end thereof, a seatbelt cutter, a window hammer for breaking an automobile window, and a pair of magnetic clamps having handles thereon for utilization by a user to remain on or in proximity to the automobile or other metal structure, especially during a flood.

To this end, in an embodiment of the present invention, an automobile safety kit is provided. The automobile safety kit comprises a rigid, resilient container containing a length of rope having a clip thereon, a window-breaking hammer, a seat belt cutting device, at least one magnetic handle, and a visual or audible indicator.

In an embodiment, the rigid, resilient container comprises a hinged end and a closure end.

In an embodiment, the container is translucent or transparent for allowing visual inspection therein.

In an embodiment, the clip on the rope is a carabineer.

In an embodiment, the window-breaking hammer comprises a frusto-conical element for focusing striking force on a window for breaking the window.

In an embodiment, the seat belt cutting device comprises a blade.

In an embodiment, the seat belt cutting device comprises a blade within a sheath.

In an embodiment, the seat belt cutting device comprises a blade and a blade guard covering the blade.

In an embodiment, the hammer and the seat belt cutting device are contained on an apparatus, the hammer on one end of the apparatus and the seat belt cutting device is on the opposite end of the apparatus.

In an embodiment, the apparatus further comprises a grip for holding the apparatus.

In an embodiment, the visual indicator is a light.

In an embodiment, the light is an LED.

In an embodiment, the audible indicator is a siren.

In an embodiment, the automobile safety kit comprises both a visual indicator and an audible indicator.

In an embodiment, the apparatus further comprises the visual indicator of the audible indicator.

In an embodiment, the magnetic handles comprise a first end comprising a magnet and a second end comprising a handle, wherein the magnet clamps to a metal structure and the handles allow a user to hold thereto.

In an alternate embodiment of the present invention, a method of using an automobile safety kit is provided. The method comprises the steps of: providing a rigid, resilient container containing a length of rope having a clip thereon, a window-breaking hammer, a seat belt cutting device, at least one magnetic handle, and a visual or audible indicator; using the seat belt cutting device to cut a seat belt to allow a user to escape from an automobile.

In an embodiment, the method further comprises the step of: using the window-breaking hammer to break an automobile window to escape an automobile.

In an embodiment, the method further comprises the step of: using the rope to anchor an individual to the automobile by tying the rope around the individual and tying the rope to an anchoring point within the automobile.

In an embodiment, the method further comprises the step of: using the magnetic handles to magnetically hold to the roof of an automobile by clamping the magnets to a metal structure of the automobile and holding onto the magnetic handles.

It is, therefore, an advantage and objective of the present invention to provide an automobile safety kit that aids an individual in escaping an automobile.

Specifically, it is an advantage and objective of the present invention to provide an automobile safety kit that allows a passenger to open doors and/or windows during a natural disaster, such as a flood or the like.

In addition, it is an advantage and objective of the present invention to provide an automobile safety kit comprising a seatbelt cutter that allows a user to cut the seatbelt to aid the user in escaping an automobile during an emergency.

Further, it is an advantage and objective of the present invention to provide an automobile safety kit that allows an individual to tether himself or herself, or another passenger, to an anchor, such as to the automobile itself.

Specifically, it is an advantage and objective of the present invention to provide an automobile safety kit that allows an individual to remain anchored to the automobile so that he or she is not swept away by fast moving currents.

Still further, it is an advantage and objective of the present invention to provide an automobile safety kit that allows a user to easily remain atop an automobile during a flood event.

More specifically, it is an advantage and objective of the present invention to provide an automobile safety kit that provides a user with magnetic clamps with handles so that a user may magnetically clamp him or herself to the top of the vehicle, such that the user may have sufficient grip.

Moreover, it is an advantage and objective of the present invention to provide an automobile safety kit having a visual or audible indicator to aid others in rescuing passengers.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to an automobile safety kit and methods of using the same. Specifically, the present invention comprises safety articles contained within a rigid, resilient and easily-openable container having items therein useful for protecting automobile passengers during a flood or other natural disaster event. The kit preferably comprises a length of resilient rope having a carabineer or other connector on an end thereof, a seatbelt cutter, a window hammer for breaking an automobile window, and a pair of magnetic clamps having handles thereon for utilization by a user to remain on or in proximity to the automobile or other metal structure, especially during a flood.

Figure 1:
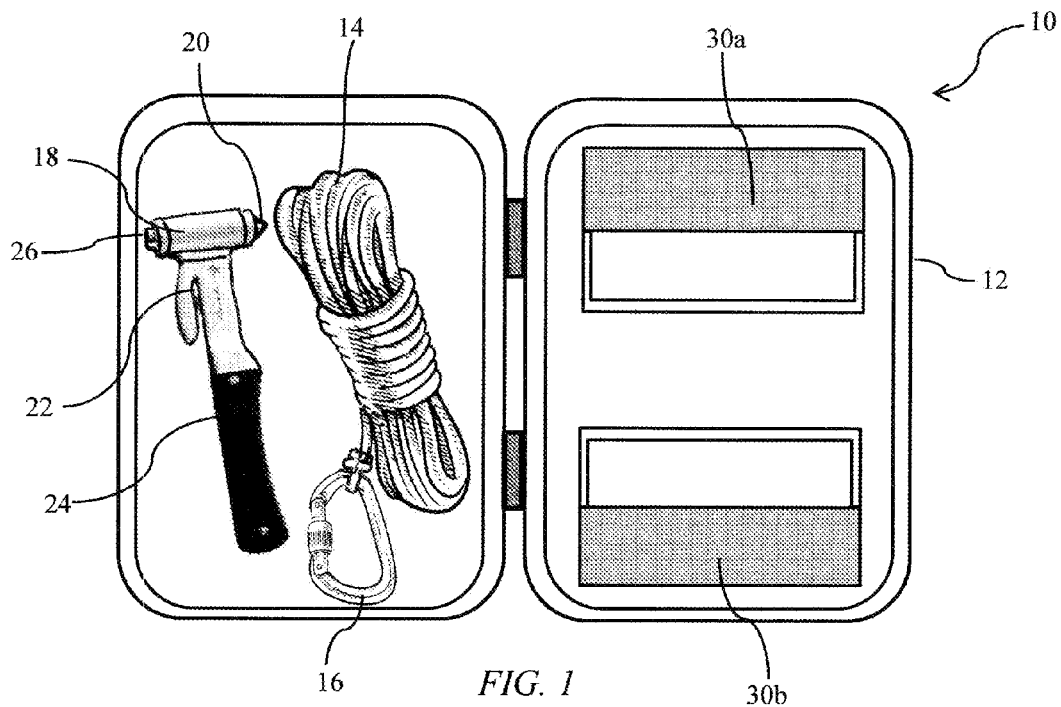
FIG. 1 illustrates a top view of an automobile safety kit in an embodiment of the present invention.

Now referring to the figures, wherein like numerals refer to like parts, FIG. 1 illustrates an automobile safety kit 10 comprising items useful for an individual or passenger of an automobile who may be trapped within the automobile during an extreme event, such as a natural disaster, a flood, hurricane, tornado, earthquake, or other disaster. The kit 10 may include a rigid and resilient container 12 in which safety items may be stored. Preferably, the container 12 is a plastic box having a hinged side and a closure side, allowing the container 12 to hold the safety items therein, but be easily accessible and openable during an emergency. The container may further be transparent or translucent to allow visual inspection of the items contained therein.

Stored within the container 12 may be several items useful for an individual in a natural disaster. Specifically, the container 12 may hold a length of rope 14 with a clip 16, such as a carabineer, on an end thereof. The rope 14 and clip 16 may be useful for any purpose, but preferably may allow a user to tether him or herself, or another individual, to an anchor, as described below. The rope may be of sufficient length and strength, as needed by a user thereof.

Moreover, the container 12 may have an automobile safety apparatus 18 comprising a window-breakable hammer end 20 and a seat belt cutter end 22. The safety apparatus 18 may further comprise a grip 24 for a user to hold tightly thereon when using the same. Moreover, the safety apparatus 18 may further have a visual indicator 26, such as a light, on an end thereof, that may be activated as needed.

The hammer end 20 may be a solid, metal, frusto-conically-shaped element that may focus a striking force on an automobile window, as needed to break the window of an automobile. Of course, any other element may be used that is useful for breaking the window. Moreover, the seat belt cutter end 22 may have a blade within a sheath or cover that allows the blade to engage a seat belt strap without cutting or injuring a user using the cutter end 22 to cut through a seat belt.

The grip 24 allows a user to hold tightly onto the apparatus 18 when using the same to break a window using the hammer end 20 or to cut a seat belt (or other strap) with the seat belt cutter end 22. When needed, the visual indicator 26 may be used to provide rescuers with a visual indicator of the passenger's location, especially in the dark or in murky waters.

The container may further contain a pair of magnetic handles 30a, 30b that may be utilized by an individual to clamp to the metal frame of an automobile or to another metal object. Each of the magnetic handles 30a, 30b may have a magnet end 32 for magnetically clamping to metal, and a handle end 34 for gripping the same.

The usage of each of the items contained within the safety kit is provided below in greater detail. It should be noted that any other safety item may be contained within the safety kit, such as communication devices, other tools, and the like, and the present invention should not be limited as described herein.

Figure 2A:
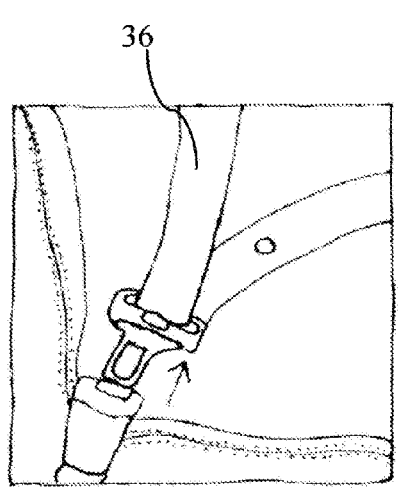
FIGS. 2A-2B illustrate methods of removing seatbelts within an automobile in an embodiment of the present invention.
Figure 2B:
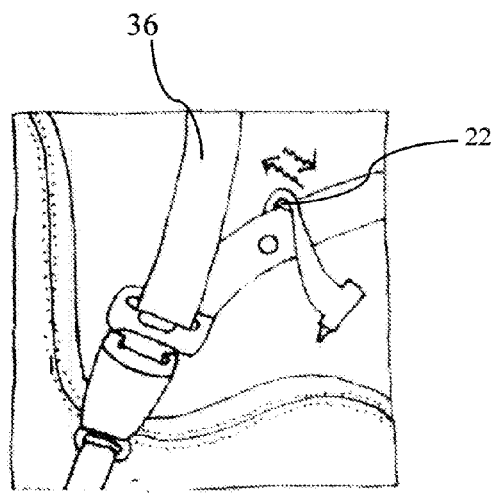

FIGS. 2A and 2B illustrate two methods of removing a seat belt. In a natural disaster, especially a flood event, it may be imperative to get out of the vehicle as quickly as possible. Thus, removal of the seatbelt may be the first objective of a passenger. Of course, as illustrated in FIG. 2A, the seat belt may simply be unbuckled as normal. However, damage to the buckle, the seat belt, entangling of the same, or any other reason, may prevent a passenger from removing the seat belt. Thus, the seat belt cutter end 22 of the safety apparatus 18 may be utilized to cut through the seat belt, allowing a passenger to escape the automobile.

Figure 3A:
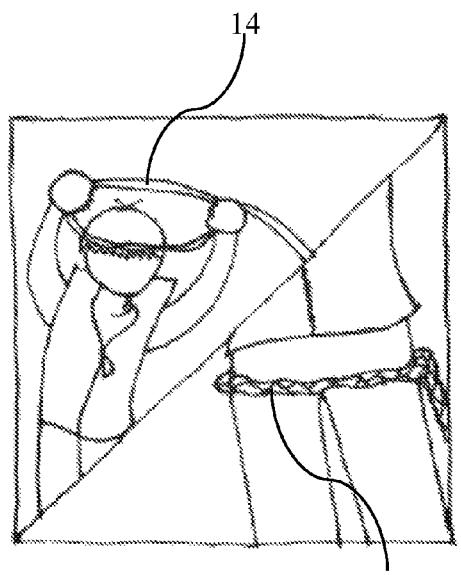
FIGS. 3A-3B illustrate methods of tethering oneself to an automobile in an embodiment of the present invention.
Figure 3B:
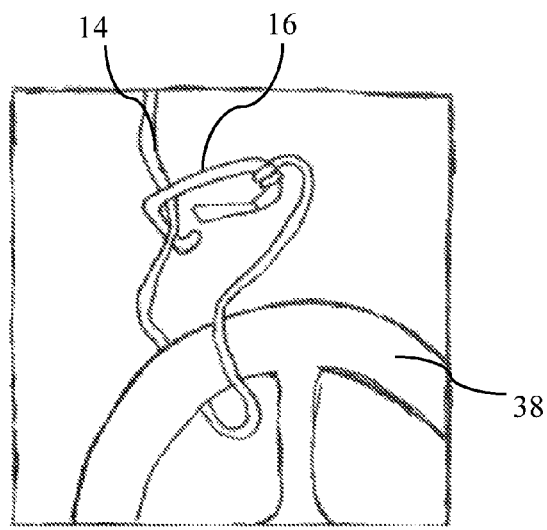

FIGS. 3A and 3B illustrate a method of tying the rope around an individual and tethering the individual to an anchor. For example, flood waters may move swiftly, and it is often safer to remain with the automobile, rather than get swept away. Thus, a user may remove the rope from the kit 10 and tie the rope around the individual. The rope can be knotted, or a clip or carabineer (not shown) may be utilized for this purpose. As illustrated in FIG. 3, the clip 16 may quickly allow the rope 14 to be looped around an anchoring point, such as a steering wheel 38. Thus, the individual may be tethered to the automobile, using the automobile as an anchor to prevent the user from being swept away by currents or the like.

Figure 4A:
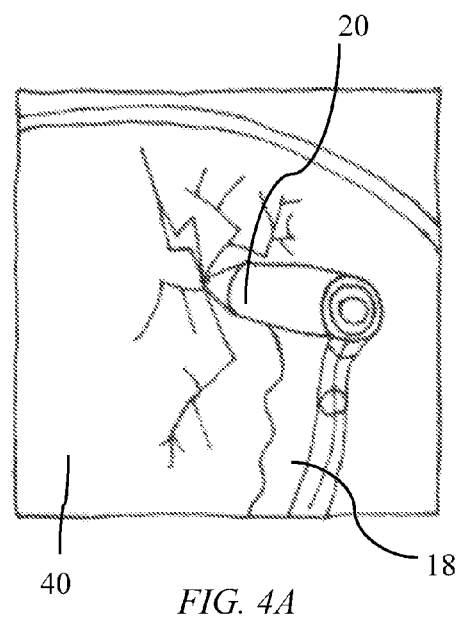
FIGS. 4A-4B illustrate methods of breaking automobile windows in an embodiment of the present invention.
Figure 4B:
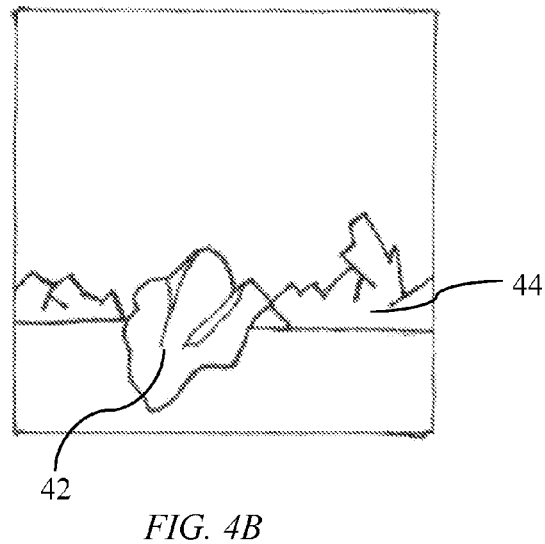

FIGS. 4A and 4B illustrate how to safely open a window and escape through the window. Specifically, the hammer end 20 of the safety apparatus 18 may be utilized to break an automobile window 40. Once the window is broken, the remaining glass should be removed so that the passenger does not cut him or herself when exiting through the broken window. Preferably, a floor mat 42 may be used to drape over the broken glass 44 so that the remaining glass shards do not cut the passenger.

Figure 5A:
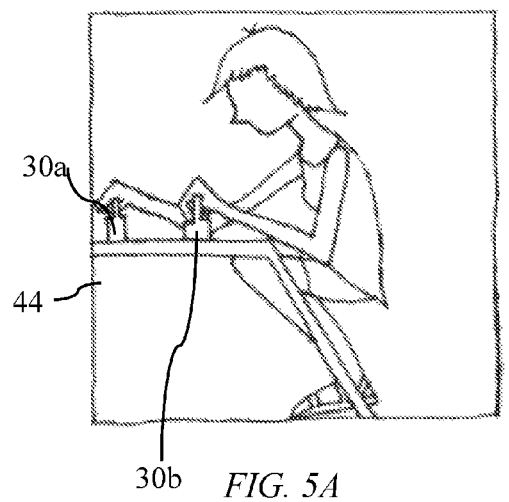
FIGS. 5A-5B illustrate a method of holding to the top of an automobile and methods of signaling rescuers in an embodiment of the present invention.

FIG. 5A illustrates use of the magnetic handles 30a, 30b to remain atop a vehicle 44. Specifically, the magnetic handles 30a, 30b may be held by a user who crawls onto the roof of a vehicle. During a flood event, swift moving currents may make it difficult and dangerous to remain on top of the vehicle, especially if there is no rack or other means to hold. Thus, the magnetic handles 30a, 30b may magnetically clamp to the top of the vehicle 44 and remain held in place, allowing the passenger to hold thereon.

Figure 5B:
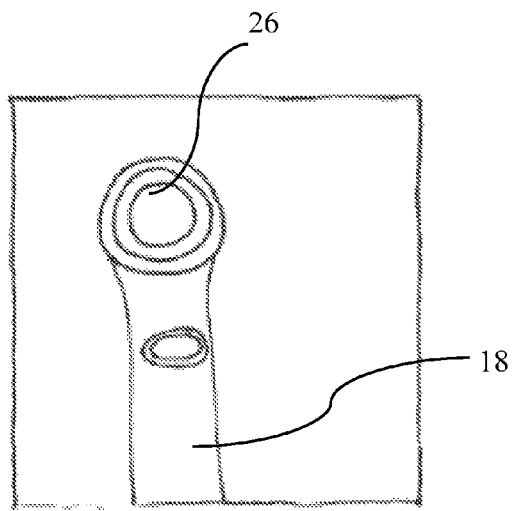

Finally, FIG. 5B illustrates a visual indicator 26 that may be utilized to provide rescuers a visual focal point when attempting a rescue. Oftentimes, it is difficult for rescuers to see, especially at night or in murky water, and the light may be utilized to help rescuers. An audible indicator (not shown) may also be used to alert rescuers to the location of the vehicle.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

We claim:

1. An automobile safety kit comprising:
   a rigid, resilient container containing a length of rope having a clip thereon, a window-breaking hammer, a seat belt cutting device, at least one magnetic handle, and a visual or audible indicator.

2. The automobile safety kit of claim 1 wherein the rigid, resilient container comprises a hinged end and a closure end.

3. The automobile safety kit of claim 1 wherein the container is translucent or transparent for allowing visual inspection therein.

4. The automobile safety kit of claim 1 wherein the clip on the rope is a carabineer.

5. The automobile safety kit of claim 1 wherein the window-breaking hammer comprises a frusto-conical element for focusing striking force on a window for breaking the window.

6. The automobile safety kit of claim 1 wherein the seat belt cutting device comprises a blade.

7. The automobile safety kit of claim 1 wherein the seat belt cutting device comprises a blade within a sheath.

8. The automobile safety kit of claim 1 wherein the seat belt cutting device comprises a blade and a blade guard covering the blade.

9. The automobile safety kit of claim 1 wherein the hammer and the seat belt cutting device are contained on an apparatus, the hammer on one end of the apparatus and the seat belt cutting device is on the opposite end of the apparatus.

10. The automobile safety kit of claim 9 wherein the apparatus further comprises a grip for holding the apparatus.

11. The automobile safety kit of claim 9 wherein the visual indicator is a light.

12. The automobile safety kit of claim 11 wherein the light is an LED.

13. The automobile safety kit of claim 1 wherein the audible indicator is a siren.

14. The automobile safety kit of claim 1 comprising both a visual indicator and an audible indicator.

15. The automobile safety kit of claim 9 wherein the apparatus further comprises the visual indicator of the audible indicator.

16. The automobile safety kit of claim 1 wherein the magnetic handles comprise a first end comprising a magnet and a second end comprising a handle, wherein the magnet clamps to a metal structure and the handles allow a user to hold thereto.

17. A method of using an automobile safety kit comprising the steps of:
prov020
providing a rigid, resilient container containing a length of rope having a clip thereon, a window-breaking hammer, a seat belt cutting device, at least one magnetic handle, and a visual or audible indicator;
using the seat belt cutting device to cut a seat belt to allow a user to escape from an automobile.

18. The method of claim 17 further comprising the step of:
using the window-breaking hammer to break an automobile window to escape an automobile.

19. The method of claim 17 further comprising the step of:
using the rope to anchor an individual to the automobile by tying the rope around the individual and tying the rope to an anchoring point within the automobile.

20. The method of claim 17 further comprising the step of:
using the magnetic handles to magnetically hold to the roof of an automobile by clamping the magnets to a metal structure of the automobile and holding onto the magnetic handles.

* * * * *